(12) United States Patent
Eichhorn

(10) Patent No.: US 7,792,168 B2
(45) Date of Patent: Sep. 7, 2010

(54) HEAT CAPACITY LASER AND ASSOCIATED LASING MEDIUM

(75) Inventor: Marc Eichhorn, Mannheim (DE)

(73) Assignee: Institut Franco-Allemand de Recherches de Saint-Louis, Saint-Louis (FR)

( * ) Notice: Subject to any disclaimer, the term of this patent is extended or adjusted under 35 U.S.C. 154(b) by 0 days.

(21) Appl. No.: 12/219,204

(22) Filed: Jul. 17, 2008

(65) Prior Publication Data

US 2009/0022190 A1    Jan. 22, 2009

(30) Foreign Application Priority Data

Jul. 17, 2007    (DE) .................. 10 2007 033 624

(51) Int. Cl.
  *H01S 3/14*    (2006.01)
  *H01S 3/17*    (2006.01)
  *H01S 3/09*    (2006.01)

(52) U.S. Cl. .................. 372/39; 372/40; 372/66; 372/69; 372/70

(58) Field of Classification Search .................. 372/39, 372/69–72, 78
  See application file for complete search history.

(56) References Cited

U.S. PATENT DOCUMENTS

| | | | |
|---|---|---|---|
| 5,463,649 A * | 10/1995 | Ashby et al. .................. 372/40 |
| 5,526,372 A | 6/1996 | Albrecht et al. |
| 5,636,239 A * | 6/1997 | Bruesselbach et al. ........ 372/70 |
| 5,936,984 A * | 8/1999 | Meissner et al. .............. 372/34 |
| 6,115,400 A * | 9/2000 | Brown .......................... 372/93 |
| 6,862,308 B2 | 3/2005 | Stappaerts |
| 6,937,636 B1 * | 8/2005 | Beach et al. .................. 372/66 |
| 7,161,968 B2 * | 1/2007 | Mercer .......................... 372/39 |
| 2002/0097769 A1 * | 7/2002 | Vetrovec ...................... 372/75 |
| 2007/0217475 A1 * | 9/2007 | Betin et al. ................... 372/54 |

* cited by examiner

Primary Examiner—Minsun Harvey
Assistant Examiner—Phillip Nguyen
(74) Attorney, Agent, or Firm—Oliff & Berridge, PLC

(57) ABSTRACT

A heat capacity laser having a solid lasing medium, at least one pumping source that is able to emit a pumping radiation, and an optical cavity that can be characterized by having: at least one device able to homogenize the pumping radiation, a doped lasing medium having a body with a first and a second end and being stretched in the length by more than 6 cm and whose height in cross section is less than its stretching in the length of the lasing medium. The doping concentration in the lasing medium may vary axially. Also either the cavity can have beam forming optics and the doping concentration of the lasing medium is radially uniform, or the cavity can have no beam forming optics and the lasing medium has a doping concentration that may vary radially.

24 Claims, 2 Drawing Sheets

HEAT CAPACITY LASER AND ASSOCIATED LASING MEDIUM

TECHNICAL FIELD OF THE INVENTION

The pending disclosure relates to a heat capacity laser. Generally, the lasing medium of the laser is not cooled in the lasing mode. The time for which a lasing medium can be used is limited by its heat capacity. Heat capacity can be defined as the mass of the lasing medium multiplied by its specific heat.

BACKGROUND

A heat capacity laser was described for the first time in U.S. Pat. No. 5,526,372 A. The heat capacity laser has a solid lasing medium, a pumping source, and an optical cavity. The specificity of the heat capacity laser resides in the fact that it is not cooled in lasing mode. On the contrary, the heat released is stored in the lasing medium. As a result, the duration of the lasing mode is a function of the maximum amount of thermal energy storable in the lasing medium. The maximum amount of thermal energy that can be stored is a function of the mass of the lasing medium, the specific heat of the lasing medium material, and the difference between the starting temperature and the final temperature. U.S. Pat. No. 5,526,372 A deals in particular with the temperature distribution in the lasing medium. The text of this patent indicates that it is extremely advantageous for the temperature to be higher outside than inside the lasing medium. In proportion to the temperature level, a greater expansion is observed outside the lasing medium. As a result, this means that the lasing medium will undergo greater compression stresses outside—a phenomenon to be favored. In terms of its mechanical characteristics, the lasing medium can be compared to glass: it withstands high compression stresses but low tensile stresses. If there are defects on the outer surface, the outside compression stresses do not bring about fissure propagation. Related to the duration of the lasing mode referred to above, the compression stresses in the outer envelope are able to raise the maximum temperature allowable by the lasing medium. As a result, the amount of heat stored is increased. The operating time in lasing mode is thus prolonged.

U.S. Pat. No. 6,862,308 B2 describes another heat capacity laser. For this heat capacity laser, a barrel with several lasing media is used, as well as a loading and unloading device. When a lasing medium has reached is maximum temperature, it is unloaded and cooled. At the same time, it is replaced by another cooled lasing medium coming from the barrel. In this patent, the reader's attention is drawn to the fact that the temperature is higher on the outside of the lasing medium, and to the tensile stresses under pressure generated by this fact, so that higher temperatures can be tolerated.

SUMMARY

In the case of the heat capacity laser described in U.S. Pat. Nos. 5,526,372 A and 6,862, 308 B2, it should be noted that the temperature differences desired to ensure mechanical strength give rise to one disadvantage. The fact that the outside temperature is higher than the inside temperature favors formation of a thermal lens. Moreover, the alternating compressive and tensile stresses in the lasing medium bring about double refraction. This degrades the quality of the laser beam. The negative effect of the thermal lens is particularly apparent in the case of high laser powers.

In some aspects, the present application can provide a heat capacity laser with a high beam quality that nonetheless allows high lasing power.

The solution provided can be a heat capacity laser having a solid lasing medium, at least one pumping source able to emit a pumping radiation, and an optical cavity. Some embodiments of the heat capacity laser can be characterized by having:

At least one device able to homogenize the pumping radiation,

A doped lasing medium having a body with a first and a second end and being extended in the length by more than 6 cm and whose height in cross section is less than its extension in the length, Possibly, a first means for guiding a pumping radiation in the direction of a first end of the lasing medium, and in that, on one hand, the doping concentration in the lasing medium varies axially, this concentration being less at the first end and increasing up to the center of the lasing medium and, on the other hand, either the cavity has beam forming optics able to ensure homogenization of the laser beam in a lasing phase and a doping concentration of the lasing medium is radially uniform, or the cavity has no beam forming optics able to ensure homogenization of the laser beam in the lasing phase and the lasing medium has a doping concentration that varies radially, the radial distribution of the doping of the lasing medium being defined such that the doping increases radially from the edge to the center of the body.

In some aspects, advantages of this disclosure reside in the fact that, in lasing mode, the lasing medium can be heated homogenously at all points. Thus, the mechanical stresses can remain limited inside the lasing medium. This allows power levels of 10 kW to over 1 MW to be produced. With regard to the optical quality of the laser beam, the double refraction brought about by the stress can be minimized, so that no thermal lens is formed. This fact favors beam quality. A beam quality $M^2$ of less than 5 can be obtained. The heat capacity laser first of all has a solid lasing medium, a pumping source, and an optical cavity. The lasing medium can be over 6 cm long. Its height can be less than its length. If the lasing medium has such a length and such a length-height ratio, this means that the absorption length is long. A long absorption length can lead to less heat load as a function of volume and hence a longer operating time of the lasing medium, as well as lower heat stresses.

The pumping light can be introduced at one end or both ends of the lasing medium. In the latter case, the doping concentration in the laser medium varies axially, this concentration being lower at each of the first and second ends of the lasing medium and increasing toward the center of the body and the heat capacity laser may have second means for guiding a pumping radiation in the direction of a second lasing medium.

By these measures, it is possible to achieve homogenous heating of the medium, in the axial direction as well. This is because the doping increasing in the axial plane can cause an increase of absorption by volume, which offsets the drop in pumping power caused by the absorption. Thus, each unit volume absorbs the same amount of pumping energy along the axis.

Furthermore, a device for homogenizing the pumping light is used. By means of the pumping light homogenization device, the pumping light is introduced at the insert end with a homogenous beam density. As a result, the pumping light illuminates the lasing medium homogenously over its entire section. There is thus a homogenous energy coupling over the entire section surface. By these measures, homogenous heating of the lasing medium in the radial direction is achieved.

The pumping light homogenization device may be comprised of a hollow optical waveguide whose interior is reflective, or a homogenous, transparent optical waveguide. For the second type of optical waveguide, a fully-reflecting truncated pyramid, for example, can be used, which is made of optically transparent material. Because of the total internal reflection, the homogenized pumping light is directed toward the lasing medium and fully illuminates its section in a homogenous manner. Thus, it is effectively absorbed.

Furthermore, the laser can use either a beam forming optics to ensure homogenization of the laser beam in the lasing phase, accompanied by uniform doping of the lasing medium in the radial plane, or, if the laser has no beam forming optics, the laser beam can have a Gaussian profile and the lasing medium includes doping whose radial distribution is defined such that the doping increases from the edge to the center of the lasing medium body. The first option—utilization of beam forming optics—can enable uniform extraction of energy by the laser radiation. When this is combined with uniform introduction of the pumping light, homogenous distribution of the heat load in the lasing medium can be achieved. On the other hand, the second option—the beam Gaussian profile—is based on the intention to adjust the doping profile radially such that the combination of the Gaussian beam profile with homogenous distribution of pumping light can allow homogenous distribution of the heat loss over the volume. Since the energy stored in the optic crystal can be more easily evacuated at the points where the laser intensity is greatest, more pumping light generally needs to be absorbed at these same spots to ensure homogenous heat generation in the radial plane. Starting from the principle of homogenous distribution of the pumping light radially, doping should typically be greater at the center of the rods than on the sides.

According to another embodiment of the invention, the lasing medium is doped with erbium, thulium, or holmium. Each of these dopings allows the laser beam to be produced in an eye-safe spectral range. The wavelength is greater than 1400 nm. Each of the above-listed dopants is fully adapted to the long absorption path of over 6 cm.

According to another embodiment of the invention, a stopping device is used to interrupt the lasing mode as soon as the difference in relative maximum temperature related to the average temperature of the lasing medium, expressed in Kelvin, is 6% at various points of the lasing medium on the lengthwise and transverse axes. The beam quality is good, up to the temperature difference value indicated. The thermal lens effect is negligible, up to the indicated percentage limit. Moreover, the mechanical stress of the lasing medium is typically at a low level.

According to another embodiment of the invention, the stopping device also has a calculator that is connected to at least two temperature sensors enabling the temperature to be measured at two different points. This calculator also has either a memory including the data of the pump radiation power and the laser radiation power generated during laser shots, these powers being reproducible in principle, or connections with sensors able to measure, in real time, parameters related to the pumping radiation power and the laser power. One advantage of the stopping device described above resides in the fact that the values of the pumping power and laser power parameters are known in any event. Hence only two additional temperature sensors may be needed. An already available computer can carry out the calculator function.

According to another embodiment of the invention, each pumping light introduction end of the lasing medium has a tapered shape.

This geometry can enable a good transition to be made between the pumping light homogenization device and the lasing medium. Thus, the pumping light can be injected with very high efficiency. The conical ends also enable to break the exact cylinder symmetry to be refracted precisely. As a result, for the spontaneously emitted light, an additional small reflection angle is added to the propagated light beam, which applies to any internal reflection in the lasing medium at its ends. Thus, limited propagation distances can be obtained for the spontaneous emission. This typically minimizes amplified spontaneous emission (ASE) which would have a limiting effect on the laser power.

According to another embodiment of the invention, the outer surface of the lasing medium has optical polishing. This optical polishing can enable pumping light to be reflected.

According to another embodiment of the invention, a reflective optical coating is applied to the optical polishing, and this selectively reflects the pumping light. The pumping light can be still more effectively utilized in this way. Accordingly, the spontaneously emitted light can leave the lasing medium, avoiding formation of an ASE effect.

According to another embodiment of the invention, underneath the polishing the lasing medium has an outer envelope doped with ions to absorb the spontaneous emission. The absorption means avoid establishment of multiple reflection of light rays from the spontaneous emission within the lasing medium. Thus, the laser output power is not typically limited by the ASE effect. It can be advantageous for the thickness of the outer envelope and the degree of its doping to be designed such that, in the lasing phase, a near-equivalent temperature is obtained in the outer envelope and in the rest of the lasing medium. This can enable the overall concept of a homogenous heating lasing medium to be taken into account. If a reflective optical coating is applied, the characteristics of the pumping light can be reduced or set aside altogether.

According to another embodiment of the invention, the heat capacity laser has a barrel with several laser media and a loading and unloading device, enabling a heated lasing medium to be replaced by an unheated lasing medium. This arrangement is particularly well suited to the heat capacity laser presented here.

In some aspects, this disclosure also relates to a doped lasing medium designed for a heat capacity laser according to the invention having a body with two ends, characterized in that this body is stretched in the length by more than 6 cm and in that its height in cross section is less than its stretching in the length and in that the doping concentration in the lasing medium varies axially, this concentration being less at at least one of the ends and increasing toward the center of the lasing medium.

According to one particular feature, the doping concentration of the lasing medium varies radially, the radial distribution of the doping of the lasing medium being defined such that the doping increases from the edge to the center.

This lasing medium, which is in the form of a barrel, can have a circular or polygonal cross section.

BRIEF DESCRIPTION OF THE DRAWINGS

The invention is described in greater detail hereinbelow with reference to embodiment examples shown in the drawings.

DETAILED DESCRIPTION OF EMBODIMENTS

Figure 1:
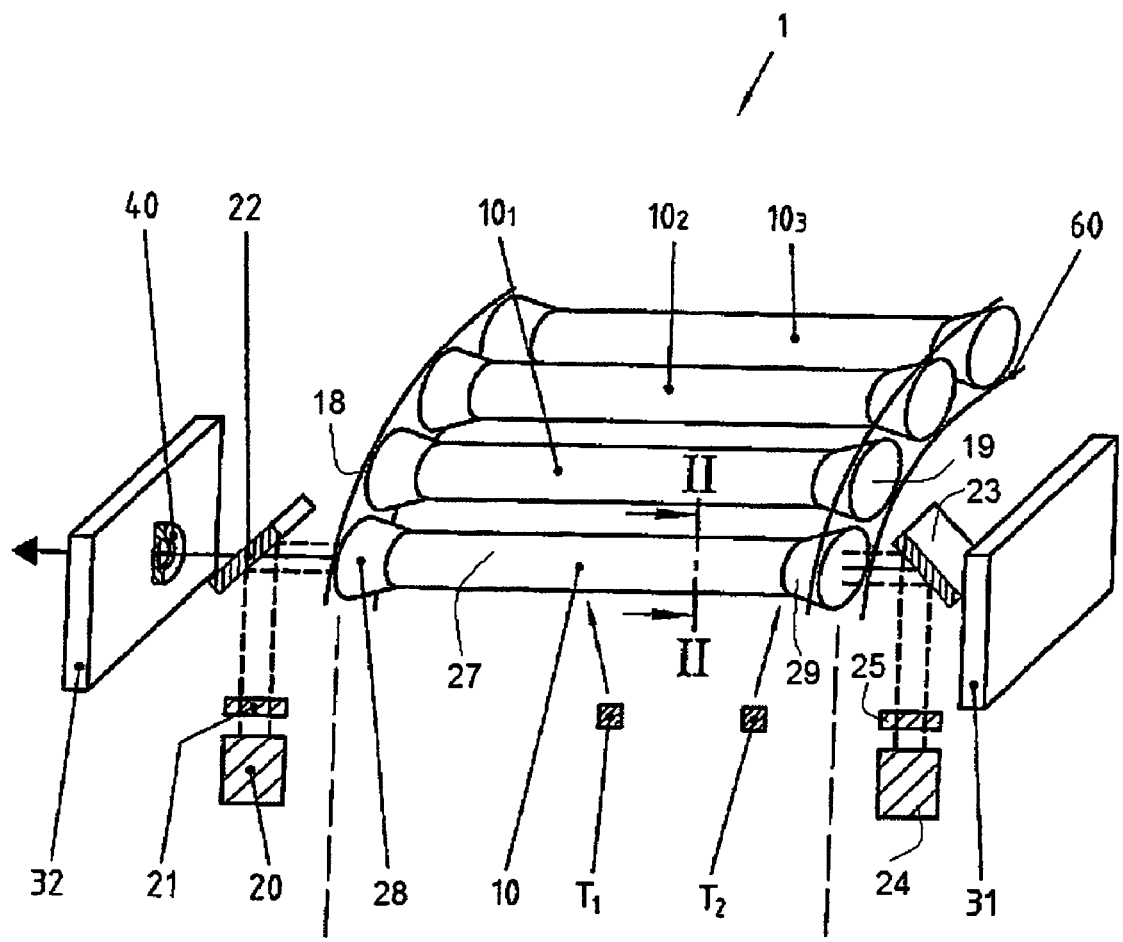
FIG. 1 illustrates a heat capacity laser in the form of a perspective drawing.

FIG. 1 shows a heat capacity laser (1). This laser has a solid lasing medium (10), two pumping light sources (20, 24), and an optical cavity. The optical cavity is comprised of a highly reflecting mirror (31) and a partially reflecting mirror (32).

Figure 2:
FIG. 2 illustrates a doping level over the length of the lasing medium, in diagram form.

The lasing medium (10) is over 6 cm in length and its height is less than its length (FIG. 2).

In the embodiment shown, the lasing medium (10) has a body (27) having a rounded cross section and a rod shape with two ends (18) and (19). In other variants, the lasing medium cross section can also be polygonal. The polygonal section gives a particularly homogenous distribution of the pumping light. This is particularly the case for low-height polygons with four or five sides. A rounded cross section has curved outer surfaces which have the negative tendency of focusing the light conducted onto the rod axis. On the other hand, rounded laser media are known to be easier to manufacture.

A device (21) allowing homogenization of the pumping light is used.

The pumping light is introduced at both ends of the lasing medium (10). In other variants, the pumping light can be introduced unilaterally, at just one end.

When the pumping light is introduced at both sides, the doping Do is lower at the ends (18, 19) where the pumping light is introduced and increases toward the middle. This phenomenon is illustrated in FIG. 2.

In the case—not shown here—of the pumping light being introduced at one side only, the doping is lower at the end where the pumping light is introduced and increases in the direction of the other end.

FIG. 1 shows a first design alternative: a beam forming optics (40) is used which homogenizes the laser beam in lasing mode, in relation to homogenous doping of the lasing medium (10) in the radial direction. An aspherical conversion element is used for the beam forming optics. This element can be made with aspherical lenses. The beam forming optics (40) converts the laser beam fundamental mode into a homogenized laser beam with a top-hat intensity distribution. The top-hat intensity distribution has a homogenous beam diameter for the beam that fills at least 95% of the section of the lasing medium (10) and tends rapidly toward zero in the direction of the edges, enabling diffraction losses at the optics aperture to be minimized.

For the top-hat distribution, the edges, namely the transition phase between homogenous intensity and level zero, should be considered:

If they are too flat, the heat load in the lasing medium (10) is typically not generated homogenously enough and the thermal effects degrade the beam quality. Moreover, the overlap between the pumping profile and the laser can be worse, making the laser beam less efficient.

If they are too steep, the diffraction can cause the top-hat beam to diverge too much, and it is difficult to keep the diameter constant over the length of the lasing medium.

Figure 4:
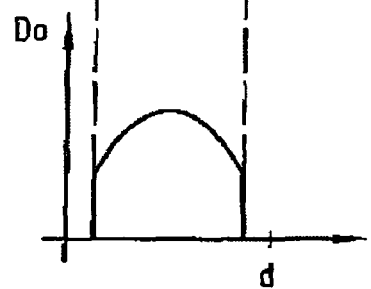
FIG. 4 illustrates the doping level at the diameter of the lasing medium in diagram form, according to a design alternative for which no beam forming optics are used.

In another variant of the version shown in FIG. 1, a second concept is possible: not using beam forming optics. In this case, the laser beam retains its Gaussian profile. Moreover, the radial distribution of the doping of the lasing medium is designed such that the doping Do increases from the edge to the center, as illustrated in FIG. 4. The letter d designates the diameter of the lasing medium.

The device (21) described in FIG. 1 is designed to homogenize the pumping light. It is a hollow optical waveguide whose inside is reflective or a homogenous, transparent optical waveguide.

If pumping sources with a small beam divergence (<4°) are used, a holographic phase plate can be placed in the path of the pumping light rays. This plate homogenizes the pumping light that illuminates the end of the lasing medium. In this case, the hollow optical waveguide or transparent optical waveguide is no longer necessary for homogenization.

The mirrors (22, 23) introduce the homogenized pumping light into the beam path. It is also possible to design a system without mirrors (22, 23). In this case, the homogenized pumping light must be introduced at an acute angle relative to the lengthwise axis of the lasing medium (10), by the ends (18, 19) at which the pumping light is introduced.

Each end of the body (27) forming lasing medium (10) is tapered in the form of a truncated cone (28, 29).

Figure 3:
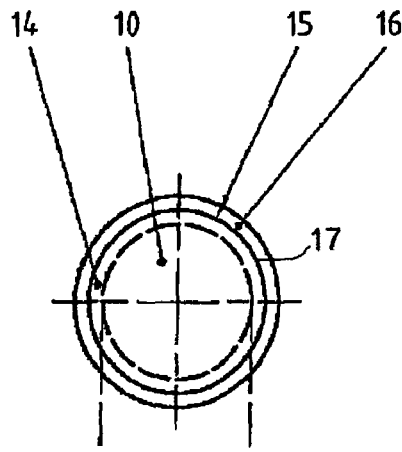
FIG. 3 illustrates the profile of the lasing medium of the heat capacity laser presented in FIG. 1, shown in cross section through line II-II.

As shown in FIG. 3, the outer surface of the lasing medium has optical polishing (15).

A reflective optical coating (16) that selectively reflects the pumping light has been applied to the optical polishing (15).

The lasing medium (10) has, below the polishing (15), an outer envelope (14) doped with ions to absorb the spontaneous emission. If erbium is used as the laser active ion, dysprosium or thulium could be used for example. The thickness of the outer envelope (14) and the level of its doping are designed such that in the laser phase a near-equivalent temperature is obtained in the outer envelope (14) and in the rest of the lasing medium (10). The spontaneous emission absorption effect can cause the outer envelope (14) to heat to a temperature comparable to that of the rest of the lasing medium (10).

The outer envelope (14) that is part of the lasing medium (10) may, as a departure to what is shown in the figure, be a coating or a layer deposited later, for example by vaporization.

The lasing medium (10) is doped with erbium. It would also be possible to use thulium or holmium to obtain a laser light in an eye-safe wavelength range at about 2 μm.

In principle, it is also possible to use neodymium or ytterbium to obtain a beam in a wavelength range outside the eye-safe range at about 1.06 μm.

For the lasing medium, a doped monocrystal or a transparent ceramic may be used. The lasing medium may be polycrystalline or amorphous. In the embodiment shown here, the lasing medium is comprised of a ceramic YAG which, as already presented, is doped with erbium.

The purpose of the following paragraph is to describe the operation of a heat capacity laser:

First, the pumping light is activated. The pumping source is comprised of laser diodes. The emitted light is concentrated and homogenized by a hollow optical waveguide which is reflective on the inside.

The lasing medium (10) has a length of 10 cm, allowing optimal absorption of pumping light when it passes.

The lasing medium (10) now emits the desired laser radiation. At the same time, the lasing medium is heated by the heat deposited in the medium when the laser is emitting.

A stopping device (50) is used, interrupting the lasing mode as soon as the relative maximum temperature related to the mean temperature ($T_{mean}$) of the lasing medium expressed in Kelvin is 6% at various spots in the lasing medium on the lengthwise and transverse axes.

Figure 5:
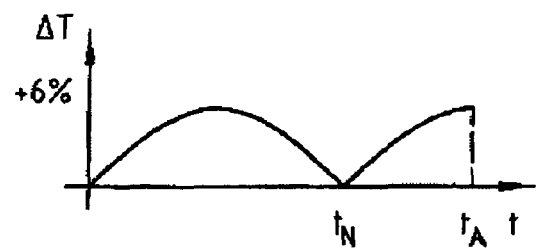
FIG. 5 shows the evolution of the relative temperature difference as a function of lasing mode activation time, in diagram form.

FIG. 5 illustrates this phenomenon: an example of a lasing medium doped homogenously in the radial plane, with variable doping in the axial plane, as shown in FIG. 2. The factor $\Delta T=(Tmax-Tmin)/T_{mean}$ represents the relative temperature difference, where Tmin and Tmax appear at the ends of the rod and in the middle of the rod. The choice of doping profile enables a homogenous temperature distribution to be obtained within the lasing medium (10) after an operating time $t_N$, as at the start of operation, the temperature having increased however. Next, the value of $\Delta T$ starts to rise again. At point $t_N$, the slope of the curve changes sign. The choice of suitable doping enables point $t_N$ to be fixed such that it is located at approximately ⅔ the operating time desired for the lasing medium. Thus, after about ⅓ of the operating time, $\Delta T$ reaches a level approximately equivalent to the level it has at the end of the operating time, at the turnoff time designated by $t_A$. The operating time is approximately 0.1 to 5 seconds.

Figure 6:
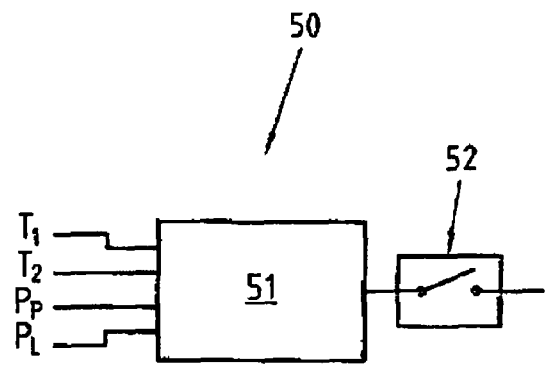
FIG. 6 illustrates a drawing of the stopping device.

As shown in FIG. 6, the stopping device (50) has a scanning calculator (51) connected to a first temperature sensor $T_1$ and a second temperature sensor $T_2$. This enables the temperature to be measured at two distinct points of the lasing medium (10). The temperature sensors $T_1$ and $T_2$ determine the temperature by a pyrometric effect. The scanning calculator (51) also enables the pumping power $P_P$ and the laser power $P_L$ parameters to be processed. The time integral of the difference between the pumping power and the laser power enables the scanning calculator (51) to calculate the mean temperature. This information is used to plot the curve in FIG. 5.

As presented in FIG. 1, the heat capacity laser has a barrel (60), similar to that of a revolver, which contains several laser media ($10_1$, $10_2$, $10_3$) as well as other laser media not shown in the figure. The figure shows no details of the loading and unloading device or the cooling system. The stopping device (50) shown in FIG. 6 enables the lasing mode to be interrupted by means of switch (52). FIG. 5 shows where stopping point $t_A$ is located. Following this, the heated lasing medium (10) is replaced by a cooled lasing medium, shown as ($10_1$) in FIG. 1.

The heat capacity laser described in this document can enable a scale factor to be applied without difficulty.

All the operating parameters, namely in particular the kinetic heating, the operating time, and the efficiency depend only on the intensity of pumping and lasing.

An increase in section can enable the necessary scale factor to be applied, while preserving pumping intensity. If the profile of the lasing medium is comparable to the length, doping of all the types of laser media that do not require minimal doping—such as resonantly pumped erbium≧can be reduced, so that the absorption length can be extended still further. This preserves the advantages of the lasing medium geometry≧profile height less than its length—while increasing the operating time by increasing the heat capacity.

Concerning the laser media with a long excitation life—such as 7 ms for erbium in YAG—it is possible to build in a Q-switch to obtain pulsed laser emission.

In one embodiment different from that shown here, the heat capacity laser can be used as a laser beam amplifier. Modulation of the pumping light at a resonance frequency of the laser relaxation oscillations also enables a pulse to be generated. This method is effective for generating pulses without increasing the pulse peak power too much—the latter being a factor of 5 to 50.

What is claimed is:

1. A heat capacity laser, comprising:
    a solid lasing medium;
    an optical cavity;
    at least one pumping source configured to emit a pumping radiation and at least one device configured to homogenize the pumping radiation; and
    a doped lasing medium having a body with a first end and a second end and being extended in a length by more than 6 cm and whose height in cross section is less than its extension in the length,
    wherein a doping concentration in the lasing medium varies axially, this doping concentration being less at the first end and increasing up to a center of the lasing medium.

2. The heat capacity laser according to claim 1, further comprises a first means for guiding the pumping radiation in the direction of the first end of the lasing medium.

3. The heat capacity laser according to claim 1,
    wherein the doping concentration is lower at each of the first and second ends of the lasing medium and increases toward the center of the body.

4. The heat capacity laser according to claim 1,
    wherein the lasing medium is doped with erbium, thulium, or holmium.

5. The heat capacity laser according to claim 1, further comprises a stopping device configured to interrupt the lasing effect when, at the latest, the maximum relative temperature difference reaches 6% relative to the average temperature of the lasing medium in degrees Kelvin, measured at various points in the lasing medium on both a vertical axis and a horizontal axis.

6. The heat capacity laser according to claim 1, further comprises a scanning calculator connected both to a first temperature sensor and to a second temperature sensor which are configured to measure the temperature of the lasing medium at two different points, and connected to a pumping level and laser power sensors.

7. The heat capacity laser according to claim 1,
    wherein the device that can homogenize the pumping radiation further comprises a hollow optical waveguide whose interior is reflective or a homogenous, transparent optical waveguide.

8. The heat capacity laser according to claim 1,
    wherein the lasing medium starting from the first end, is in the shape of a truncated cone whose base is comprised of the first end.

9. The heat capacity laser according to claim 2,
    wherein the lasing medium starting from the first end, is in the shape of a truncated cone whose base is comprised of the first end and in that, starting from the second end, the lasing medium is in the shape of a truncated cone whose based is comprised of the second end.

10. The heat capacity laser according to claim 1,
    wherein the outer surface of the lasing medium has optical polishing.

11. The heat capacity laser according to claim 9,
    wherein a reflective optical coating configured to selectively reflect the pumping radiation covers the optical polishing.

12. The heat capacity laser according to claim 9,
    wherein the lasing medium has, under the polishing, an outer envelope doped with ions that can absorb the spontaneous emission of the lasing medium.

13. The heat capacity laser according to claim 11,
wherein the thickness of the outer envelope and the level of its doping enable a quasi-equivalent temperature to be obtained, in the lasing phase, in the outer envelope and in the rest of the lasing medium.

14. The heat capacity laser according to claim 12,
wherein the laser comprising a barrel having several laser media and a loading and unloading device, the latter enabling replacement of a heated lasing medium by a non-heated lasing medium.

15. A doped lasing medium comprising:
a body with two ends, a first end and a second end,
wherein the body is extended in a length by more than 6 cm and in that its height in cross section is less than its extension in the length, and in that a doping concentration in the lasing medium varies axially, the concentration being less at least one of the ends and increasing toward a center of the lasing medium.

16. The doped lasing medium according to claim 14,
wherein the doping concentration varies radially, the radial distribution of the doping of the lasing medium being defined such that the doping increases from the edge to the center.

17. The doped lasing medium according to claim 14,
wherein starting from the first end, the lasing medium is in the shape of a truncated cone whose base is comprised of the first end and, optionally, starting from the second end, the lasing medium is in the shape of a truncated cone whose base is comprised of the second end.

18. The doped lasing medium according to claim 14,
wherein the lasing medium is doped erbium, thulium, or holmium.

19. The doped lasing medium according to claim 14,
wherein the outer surface of the lasing medium has optical polishing and is optionally covered by a reflective optical coating that can selectively reflect a pumping radiation.

20. The doped lasing medium according to claim 18,
wherein the laser medium has, under the polishing, an outer envelope doped with ions that can absorb the spontaneous emission of the lasing medium.

21. The doped lasing medium according to claim 19,
wherein the thickness of the outer envelope and the level of its doping enable a quasi-homogenous temperature to be obtained, in the lasing phase, in the outer envelope and in the rest of the lasing medium.

22. A heat capacity laser, comprising:
a solid lasing medium;
an optical cavity;
at least one pumping source configured to emit a pumping radiation and at least one device configured to homogenize the pumping radiation; and
a doped lasing medium having a body with a first and a second end and being extended in a length by more than 6 cm and whose height in cross section is less than its extension in the length,
wherein either the optical cavity has beam forming optics configured to ensure homogenization of the laser beam in a lasing phase and a doping concentration of the lasing medium is radially uniform, or the optical cavity has no beam forming optics configured to ensure homogenization of the laser beam in the lasing phase and the doping concentration of the lasing medium varies radially,
a radial distribution of the doping of the lasing medium being defined such that the doping increases radially from the edge to the center of the body.

23. The heat capacity laser according to claim 22, further comprises a first means for guiding the pumping radiation in the direction of the first end of the lasing medium.

24. The heat capacity laser according to claim 3, further comprising a second means for guiding the pumping radiation in the direction of the second end of the lasing medium.

* * * * *